(12) United States Patent
Takeguchi

(10) Patent No.: US 9,575,380 B2
(45) Date of Patent: Feb. 21, 2017

(54) DISPLAY PANEL INCLUDING WIRING PROTECTION PATTERN AND DISPLAY DEVICE

(71) Applicant: MITSUBISHI ELECTRIC CORPORATION, Tokyo (JP)

(72) Inventor: Toru Takeguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 164 days.

(21) Appl. No.: 14/156,411

(22) Filed: Jan. 15, 2014

(65) Prior Publication Data
US 2014/0204324 A1   Jul. 24, 2014

(30) Foreign Application Priority Data

Jan. 23, 2013   (JP) .................................. 2013-010036

(51) Int. Cl.
G02F 1/1345   (2006.01)
G02F 1/1362   (2006.01)

(52) U.S. Cl.
CPC ....... *G02F 1/13452* (2013.01); *G02F 1/13458* (2013.01); *G02F 2001/136218* (2013.01)

(58) Field of Classification Search
CPC .............. G02F 1/13452; G02F 1/13458; G02F 2001/136218
See application file for complete search history.

(56) References Cited

U.S. PATENT DOCUMENTS 6,480,255 B2   11/2002   Hoshino et al.
6,977,708 B2 *   12/2005   Tanaka ................ G02F 1/13452
                                                            324/760.02
8,013,454 B2 *   9/2011   Yamashita .............. H01L 24/17
                                                            257/778
2002/0085137 A1   7/2002   Fujikawa
2008/0007667 A1 *   1/2008   Nakayama ........ G02F 1/136204
                                                            349/54

FOREIGN PATENT DOCUMENTS

| JP | 2000-029061 A | 1/2000 |
| JP | 2000-194013 A | 7/2000 |
| JP | 2001-305569 A | 10/2001 |
| JP | 2009-229969 A | 10/2009 |
| JP | 2010-230885 A | 10/2010 |

OTHER PUBLICATIONS

An Office Action; "Notification of Reason(s) for Refusal" issued by the Japanese Patent Office on Nov. 1, 2016, which corresponds to Japanese Patent Application No. 2013-010036 and is related to U.S. Appl. No. 14/156,411; with English language translation.

* cited by examiner

*Primary Examiner* — Paisley L Arendt
(74) *Attorney, Agent, or Firm* — Studebaker & Brackett PC

(57) ABSTRACT

A display panel includes a first substrate in which a display region and a circuit component mounting region are defined and a second substrate, an end of which is cut to expose the circuit component mounting region. The first substrate includes a plurality of first source wirings formed from the display region to the circuit component mounting region and a wiring protection pattern formed in a region corresponding to the cut end of the second substrate between any adjacent first source wirings. In a cross sectional view, an upper end of the wiring protection pattern is located above an upper end of the first source wirings.

10 Claims, 8 Drawing Sheets

F I G . 1
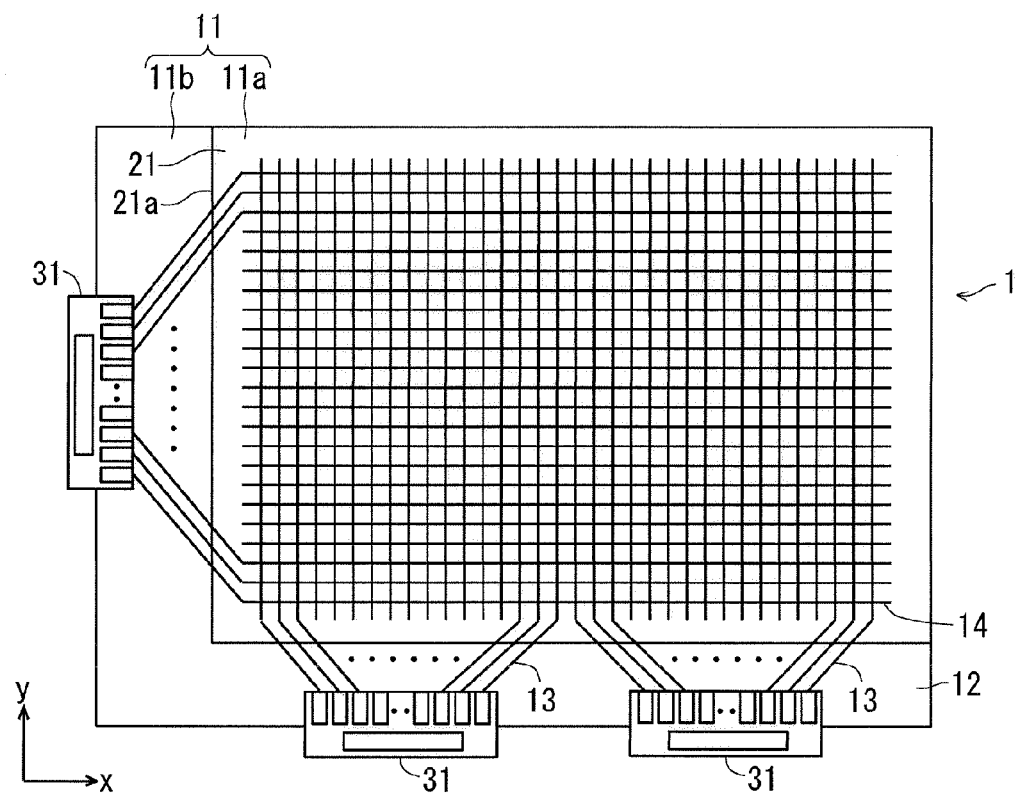

F I G . 5
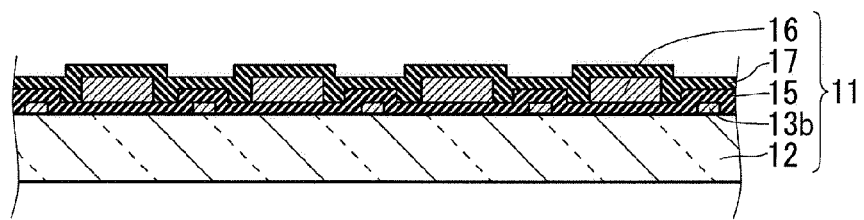

DISPLAY PANEL INCLUDING WIRING PROTECTION PATTERN AND DISPLAY DEVICE

BACKGROUND OF THE INVENTION

Field of the Invention

The present invention relates to a display panel and a display device including the same and in particular, relates to suppression of a wire breakage and the like in a display panel.

Description of the Background Art

Display devices are widely adopted as user interfaces in various fields, and liquid crystal display devices using liquid crystals are mainstream of current display devices. A liquid crystal display device is provided with a thin film transistor (TFT) array substrate, a counter substrate disposed to face the TFT array substrate, and a liquid crystal layer provided therebetween.

In the TFT array substrate, a display region for displaying video and a circuit component mounting region on which circuit components are mounted are defined. The counter substrate of the liquid crystal display device is cut to expose the circuit component mounting region.

In a cutting process for exposing the circuit component mounting region, a sharp foreign matter is generated. Particularly, in a case of using a glass plate as the substrate, a foreign matter that is sharp and firm is generated. If such the foreign matter comes into contact with (adheres to) a surface of the TFT array substrate and an external force is applied to the foreign matter, a protective film (insulating film) and a wiring of the TFT array substrate may be damaged in some cases. Moreover, if an offcut formed in the cutting process comes into contact with the surface of the TFT array substrate, the protective film and consequently the wiring of the TFT array substrate may also be damaged in some cases.

As a result, a wiring is broken and a malfunction such as a line defect of the display occurs. In addition, a product separated in an inspection during a manufacturing process due to a line defect such as a wire breakage is eliminated, so that the wire breakage is one of the factors that reduce yields of products. Moreover, in the case where a product with damage which does not cause a wire breakage during the manufacturing process passes the inspection, there is a possibility that a line defect may occur after shipment.

About this, Japanese Patent Application Laid-Open No. 2010-230885 discloses a technique for suppressing an impact on the TFT array substrate at the time of cutting the counter substrate. Specifically, Japanese Patent Application Laid-Open No. 2010-230885 discloses the technique capable of reducing an impact on the wiring disposed as a lower layer and preventing a wire breakage by forming a pattern in a floating potential state on the wiring connecting the display region and the circuit component mounting region.

In the configuration of Japanese Patent Application Laid-Open No. 2010-230885, the pattern serving as a shock absorbing layer is further formed on a plurality of wirings, respectively, so that the shock absorbing layer reduces the impact on the wirings as the lower layer. Unfortunately, the entire film thickness of a laminated film (such as the shock absorbing layer and insulating layer) on the wirings is significantly thick, and thus there is a higher probability to come into contact with a foreign matter, whereby there is a possibility that the laminated film is destroyed and the wirings are exposed. When the wirings are exposed, they become susceptible to moisture and the like from the outside, and there is a higher possibility that a malfunction such as a wire breakage occurs because electric corrosion is induced as the wirings are energized.

SUMMARY OF THE INVENTION

It is an object of the present invention to provide a technique capable of suppressing a malfunction such as a wire breakage between a display region and a circuit component mounting region.

A display panel of the present invention includes a first substrate, in which a display region that displays video and a circuit component mounting region on which circuit components are mounted are defined, and a second substrate disposed to face the display region of the first substrate, an end of the second substrate being cut to expose the circuit component mounting region of the first substrate. The first substrate includes a plurality of first wirings formed from the display region to the circuit component mounting region and a wiring protection pattern formed in a region corresponding to cut the end of the second substrate between any adjacent first wirings. In a cross sectional view, an upper end of the wiring protection pattern is located above an upper end of the first wirings.

An upper end of a wiring protection pattern is formed to be positioned above a first wiring, which prevents the first wiring from coming in contact with a foreign matter. Therefore, a malfunction such as a wire breakage by a cut end of a second substrate can be suppressed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are plan views showing a configuration of a display panel according to a first preferred embodiment;

FIGS. 4 and 5 are cross sectional views showing the configuration of the display panel according to the first preferred embodiment;

DESCRIPTION OF THE PREFERRED EMBODIMENT

Figure 2:
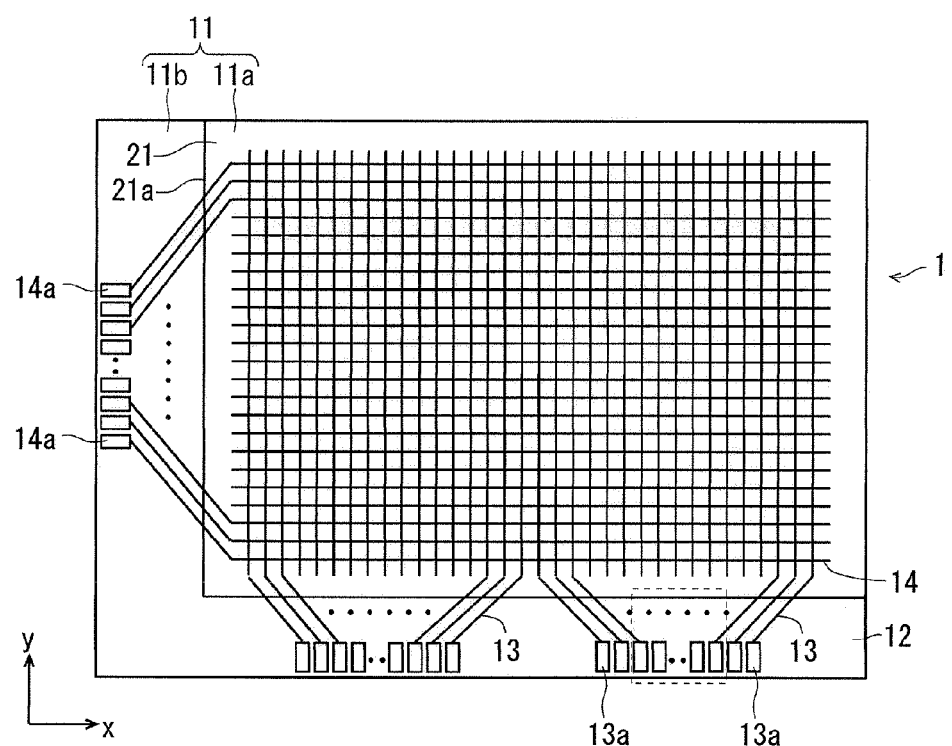

A preferred embodiment of the present invention is described below with reference to the drawings.

Dimensions, materials, shapes, and relative positions of respective structural elements shown as examples in the preferred embodiment are changed suitably depending on a structure of an apparatus to which the present invention is applied and various conditions and the present invention is not restricted to the examples. The dimensions of the respective structural elements in the respective drawings may be different from actual dimensions.

First Preferred Embodiment

FIG. 1 is a plan view showing a configuration of a display panel provided in a display device according to a first preferred embodiment of the present invention. The case where the display device and the display panel are a liquid crystal display device and a liquid crystal display panel respectively is described below as an example. However, the display device and the display panel are not limited to these, and they may be a display device and a display panel of other systems as long as they include two substrates that face each other. In addition, the display device is not only provided with a display panel 1 shown in FIG. 1, but also it may be provided with a circuit substrate and the like, which are not shown, for controlling the display panel 1.

The display panel 1 is provided with a first substrate 11 such as the TFT array substrate and the like, a second substrate 21 such as a color filter substrate and the like disposed to face the first substrate 11, flexible printed circuits (FPCs) 31, an aftermentioned seal member 41, and an aftermentioned liquid crystal layer 42. In FIG. 1 and the following plan views, to make it easier to understand a structure, the second substrate 21 is regarded to be transparent to show a configuration of a back side of the second substrate 21 as well.

The first substrate 11 includes a glass substrate 12 being a transparent substrate, a plurality of source wirings 13, a plurality of gate wirings 14, and a plurality of TFTs (switching elements) which are not shown. In the first substrate 11 configured in this manner, a display region 11a that displays video (image) and a circuit component mounting region 11b on which circuit components are mounted are defined. Next, the display region 11a and the circuit component mounting region 11b will be described.

The plurality of TFTs are formed in a matrix, and the plurality of source wirings 13 (signal wirings) and the plurality of gate wirings 14 (scanning wirings) are provided to cross one another on the glass substrate 12 of the display region 11a. The plurality of source wirings 13 transmit data signals to the plurality of TFTs, respectively. The plurality of gate wirings 14 transmit select signals, which are for selectively transmitting the data signals, to the plurality of TFTs, respectively. Each of the TFTs configures pixels (pixel section) that make a change to an alignment direction and consequently a polarization direction of the liquid crystals of the liquid crystal layer 42 based on the signals from the source wirings 13 and the gate wirings 14 in order to make a change to light transmittance. In this manner, the light transmittance is selectively changed in the pixels to display video in the display region 11a.

The plurality of source wirings 13 are formed on the glass substrate 12 along x direction (here, long-side direction of the display panel 1) from the display region 11a to the circuit component mounting region 11b. Similarly, the plurality of gate wirings 14 are formed on the glass substrate 12 along y direction (here, short-side direction of the display panel 1) from the display region 11a to the circuit component mounting region 11b. In FIG. 1, some of the source wirings 13 and some of the gate wirings 14 are not shown as if they are not formed in the circuit component mounting region 11b because of the sake of simplification. As a matter of fact, they are formed in the circuit component mounting region 11b.

Next, the circuit component mounting region 11b is described. As shown in FIG. 1, while the second substrate 21 is disposed to face the display region 11a of the first substrate 11, the second substrate 21 is formed such that its end is cut to expose the circuit component mounting region 11b of the first substrate 11.

In the following description, the end which is cut in the second substrate 21 is referred to as a "cut end 21a". Moreover, a line corresponding to a shape of the cut end 21a in the plan view (FIG. 1) is referred to as a "cut line". In the first preferred embodiment, this cut line is a boundary between the display region 11a and the circuit component mounting region 11b, and the circuit component mounting region 11b is a peripheral region formed on the periphery of the display region 11a.

Circuit components are mounted on the circuit component mounting region 11b of the first substrate 11. Here, the circuit components are described as the FPCs 31 on which a driver integrated circuit (IC) and a power source for driving the driver IC are mounted.

FIG. 2 is a plan view showing the configuration which is the configuration as shown in FIG. 1 without the FPCs 31. As shown in FIG. 2, the circuit component mounting region 11b includes one terminal region in which terminals 13a of the source wirings 13 are formed and the other terminal region in which terminals 14a of the gate wirings 14 are formed. Terminals of the FPCs 31, not shown, are connected to the terminals 13a and 14a. For this reason, the driver IC of the FPCs 31 is capable of transmitting the data signals and the select signals mentioned above to the plurality of source wirings 13 and the plurality of gate wirings 14 through the plurality of terminals 13a and 14a.

Figure 3:
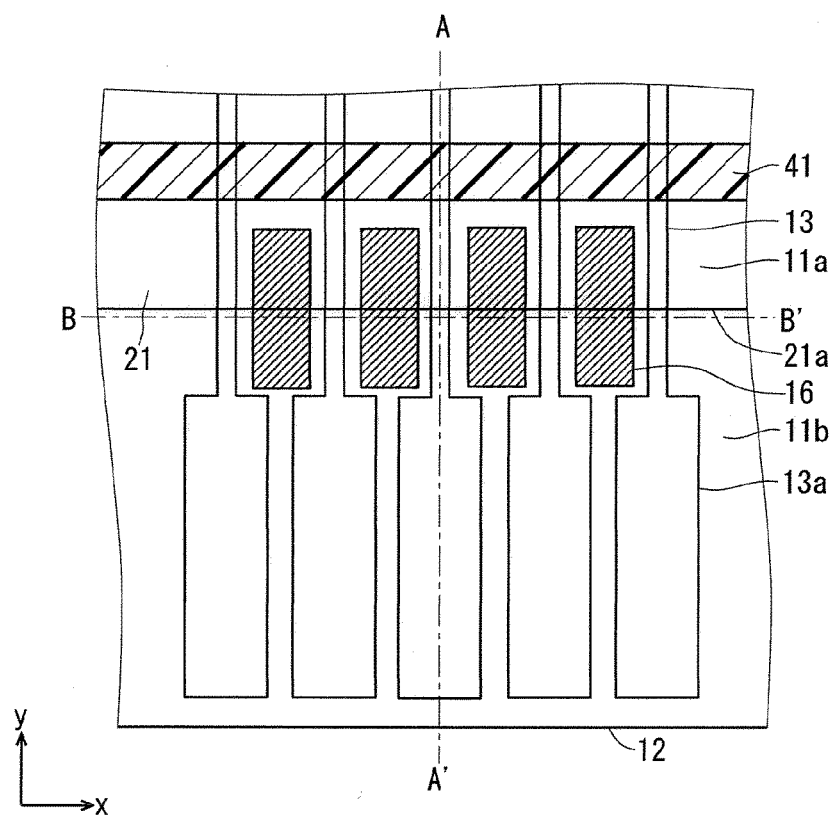
FIG. 3 is an enlarged plan view showing the configuration of the display panel according to the first preferred embodiment.
Figure 4:
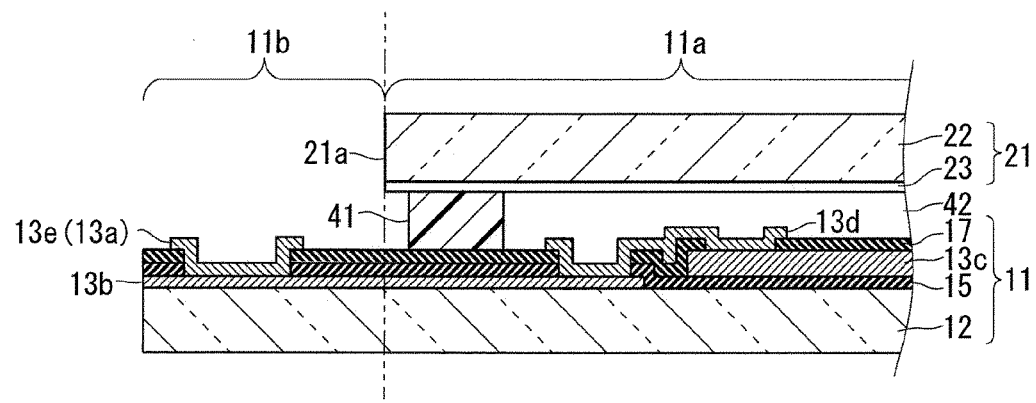

FIG. 3 is an enlarged plan view that enlarges a region surrounded by a dotted line shown in FIG. 2. FIG. 4 is a cross sectional view taken along an A-A' line shown in FIG. 3. FIG. 5 is a cross sectional view taken along a B-B' line shown in FIG. 3.

First, the second substrate 21, the seal member 41, and the liquid crystal layer 42, as mentioned above, provided in the display panel 1 will be described below.

As shown in FIG. 4, the second substrate 21 is configured to include a glass substrate 22 being a transparent substrate and a laminated film 23 (for example, a black matrix layer formed in a black matrix region, a color material layer, and a transparent electrode) formed on the surface of the glass substrate 22.

The seal member 41 is a member which connects the first substrate 11 and the second substrate 21 and it is formed between the first substrate 11 and the second substrate 21. The seal member 41 is formed on a main surface of the first substrate 11 on the second substrate 21 side and on a main surface of the second substrate 21 on the first substrate 11 side. Here, the seal member 41 is formed in a black matrix region of the outermost peripheral display region 11a, and a part of the seal member 41 is formed in the vicinity of the boundary (the cut end 21a) between the display region 11a and the circuit component mounting region 11b.

The liquid crystal layer 42 is formed such that a space surrounded by the first substrate 11, the second substrate 21, and the seal member 41 is filled up with the liquid crystals. Although it is not shown, an alignment film for regulating the alignment direction of the liquid crystals is formed on the main surface of the first substrate 11 on the liquid crystal layer 42 side and on the main surface of the second substrate 21 on the liquid crystal layer 42 side. Furthermore, in order to make the presence of the liquid crystal layer 42 clear, FIG. 4 is shown by exaggerating a thickness of the liquid crystal layer 42. In the actual configuration, the thickness of the liquid crystal layer 42 is thinner than the thickness of the first substrate 11 and the thickness of the second substrate 21, and the first substrate 11 is provided in the vicinity of the second substrate 21.

Next, a configuration, which has not been described, of the aforementioned first substrate 11 will be described. The first substrate 11 is configured to include the glass substrate 12, the plurality of source wirings 13, and the plurality of gate wirings 14 that are mentioned above. In addition to these, the first substrate 11 is configured to include an interlayer insulating film 15 (FIG. 4), a wiring protection pattern (FIGS. 3 and 5), and a protective insulating film (FIG. 4).

In the first preferred embodiment, as shown in FIG. 4, the source wirings 13 is configured to include a first source wiring 13b (a first wiring) formed (extended) from an outer edge region of the display region 11a to the circuit component mounting region 11b, a second source wiring 13c (a second wiring) formed (extended) in an inner region of the display region 11a, a transparent electrode 13d, and a transparent electrode 13e. In other words, the first substrate 11 includes the first source wiring 13b (the first wiring) and the second source wiring 13c (the second wiring).

The first source wiring 13b is formed on the glass substrate 12 (FIGS. 4 and 5). In the first preferred embodiment, this first source wiring 13b and the aforementioned gate wirings 14 are formed by patterning one metal film.

The interlayer insulating film 15 used as a gate insulating film is formed on the glass substrate 12 so as to cover the first source wiring 13b and the gate wirings 14. For example, a silicon nitride film is used for the interlayer insulating film 15.

An amorphous silicon film, not shown, the second source wiring 13c (FIG. 4), and the wiring protection pattern 16 (FIG. 5), forming the TFTs described above, are formed on the interlayer insulating film 15 by patterning. In the first preferred embodiment, the second source wiring 13c and the wiring protection pattern 16 are formed by patterning one metal film.

As shown in FIG. 3, the wiring protection pattern 16 is formed in a region corresponding to the cut end 21a of the second substrate 21 between any adjacent first source wirings 13b. Furthermore, the wiring protection pattern 16 extends in the same direction (y direction) as the extending direction of the first source wiring 13b. The wiring protection pattern 16 and the first source wiring 13b are provided close to each other. In the cross sectional view (FIG. 5), an upper end of the wiring protection pattern 16 is located above an upper end of the first source wiring 13b.

The protective insulating film 17 is formed on the second source wiring 13c and the interlayer insulating film 15 (FIG. 4) while it is formed on the wiring protection pattern 16 (FIG. 5).

The transparent electrode 13d is connected to one end of the first source wiring 13b through contact holes of the interlayer insulating film 15 and the protective insulating film 17, and it is connected one end of the second source wiring 13c through a contact hole of the protective insulating film 17. Thus, the first source wiring 13b and the second source wiring 13c are electrically connected to each other.

The transparent electrode 13e is connected to the other end of the first source wiring 13b through contact holes of the interlayer insulating film 15 and the protective insulating film 17 to configure terminals 13a.

Manufacturing Process

Next, a process of manufacturing the first substrate 11 (TFT substrate) will be described with reference to FIGS. 6A, 6B, 6C, 6D, 6E, and 6F. In FIGS. 6A, 6B, 6C, 6D, 6E, and 6F, configurations of cut surfaces along the A-A' line and the B-B' line shown in FIG. 3 are shown in FIGS. 6A to 6F according to a process sequence.

Figure 6A:
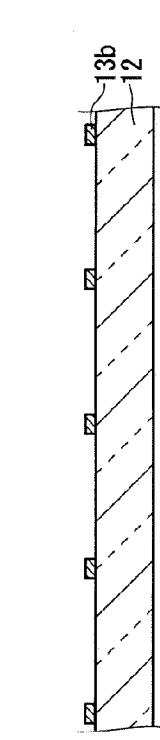
FIGS. 6A, 6B, 6C, 6D, 6E, 6F, 7A, 7B, 7C, and 7D are cross sectional views showing a method for manufacturing the display panel according to the first preferred embodiment.

First, while the gate wirings 14 are formed, a process of forming the first source wiring 13b as shown in FIG. 6A is performed. For example, the metal film to be the gate wirings 14 and to be the first source wiring 13b is formed on the glass substrate 12 by a sputtering device. After a resist is applied, exposed, and developed by a photomechanical device, the metal film is selectively etched to perform a patterning. As a result, the gate wirings 14 and the source wiring 13b are formed so as to extend from the display region 11a of the glass substrate 12 to the circuit component mounting region 11b over the boundary (cut line) between the display region 11a and the circuit component mounting region 11b.

Figure 6B:
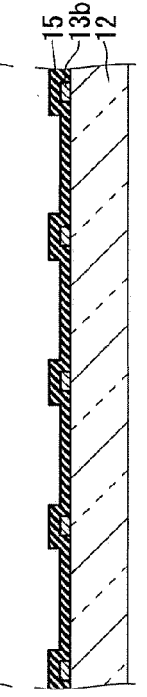

Then, as shown in FIG. 6B, the interlayer insulating film 15 composed of a silicon nitride film is formed on the glass substrate 12, the gate wirings 14, and the first source wiring 13b by a chemical vapor deposition (CVD) device. Next, the amorphous silicon layer (not shown) forming the TFTs functioning as the pixels in the display region 11a is formed on the interlayer insulating film 15. After a resist is applied, exposed, and developed by a photomechanical device, the amorphous silicon layer is selectively etched to perform a patterning.

Figure 6C:
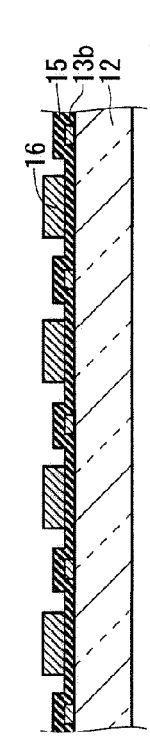

Next, as shown in FIG. 6C, a process of forming the second source wiring 13c and the wiring protection pattern 16 is performed. For example, the metal film to be the second source wiring 13c and to be the wiring protection pattern 16 is formed on the interlayer insulating film 15 by the sputtering device. After a resist is applied, exposed, and developed by a photomechanical device, the metal film is selectively etched to perform a patterning. As a result, the second source wiring 13c is formed in the display region 11a, and the wiring protection pattern 16 is formed between any adjacent gate wirings 14. According to this configuration, the wiring protection pattern 16 is capable of protecting the first source wiring 13b, and this is described later in detail.

In the cross sectional view (B-B' cross sectional view), to easily form the configuration such that the upper end of the wiring protection pattern 16 is located above the upper end of the first source wiring 13b, it is preferable that the metal film of the wiring protection pattern 16 (the second source wiring 13c) has a greater film thickness than that of the first source wiring 13b. However, it is not limited to this as long as the upper end of the wiring protection pattern 16 is located above the upper end of the first source wiring 13b.

Figure 6D:
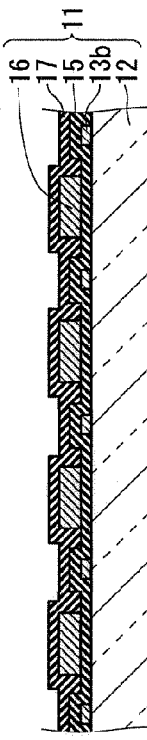

As shown in FIG. 6D, the protective insulating film 17 serving as a passivation film composed of a silicon nitride film and the like is formed on the amorphous silicon layer, the second source wiring 13c, and the wiring protection pattern 16 by the chemical vapor deposition (CVD) device.

Figure 6E:
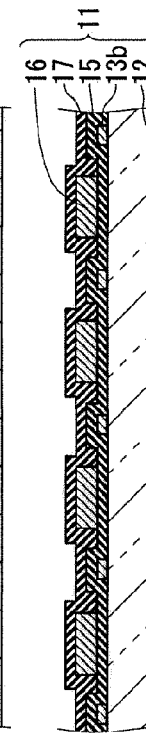

As shown in FIG. 6E, after a resist is applied, exposed, and developed by a photomechanical device, the interlayer insulating film 15 and the protective insulating film 17 are selectively etched to form contact holes on a part of the first source wiring 13b and of the second source wiring 13c.

Figure 6F:
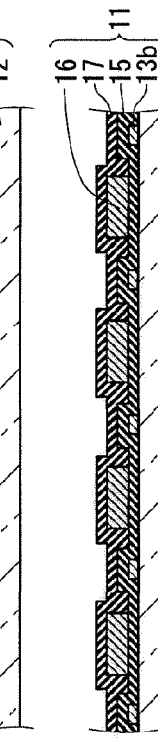

Finally, as shown in FIG. 6F, a transparent conductive film is formed by the sputtering device and the transparent conductive film is patterned by the photomechanical device, so that a transparent electrode (not shown) is formed in the pixels of the display region 11a while the transparent electrode 13d and the transparent electrode 13e are formed in the contact holes mentioned above. In this manner, the first substrate 11 (TFT array substrate) including the wiring protection pattern 16 described above is manufactured.

After that, a counter substrate 26 having the substantially same size as the first substrate 11 is provided to face the first substrate 11. This counter substrate 26 is a substrate to be the second substrate 21 and a substrate that is not given a cut to expose the circuit component mounting region 11b.

A manufacturing process before providing the counter substrate 26 to face the first substrate 11 is described below.

First, the laminated film 23 such as the black matrix layer, the color material layer, and the transparent electrode is formed on the glass substrate 22 to form the counter substrate 26. In addition, the black matrix layer is provided in the outermost peripheral black matrix region of the display region 11a. In other words, the black matrix layer (region) is provided outside the display region 11a.

The alignment film is applied to each surface of the first substrate 11 and the counter substrate 26, and the alignment films are processed by a rubbing cloth (application of the alignment film and the rubbing cloth are not shown). Then, the seal member 41 is applied to the black matrix region of the counter substrate 26. The counter substrate 26, to which the seal member 41 is applied, is arranged on top of the first substrate 11, and the seal member 41 connects the counter substrate 26 and the first substrate 11.

Figure 7A:
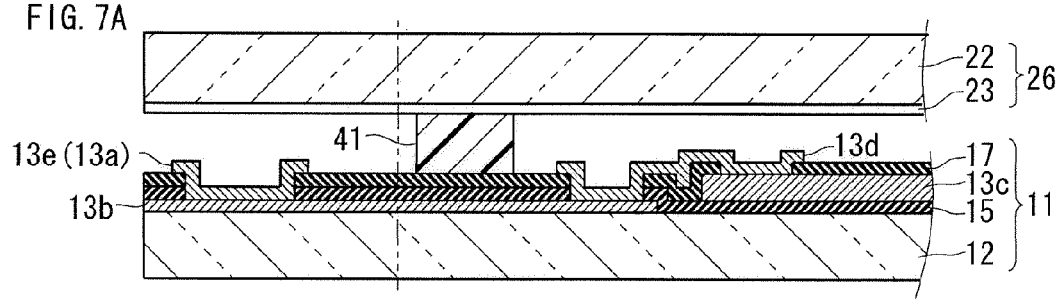

FIGS. 7A, 7B, 7C, and 7D are cross sectional views showing the manufacturing process between the instant when the counter substrate 26 and the first substrate 11 are connected and the instant when the second substrate 21 is formed. FIG. 7A shows the state in which the counter substrate 26 and the first substrate 11 are connected.

Figure 7B:
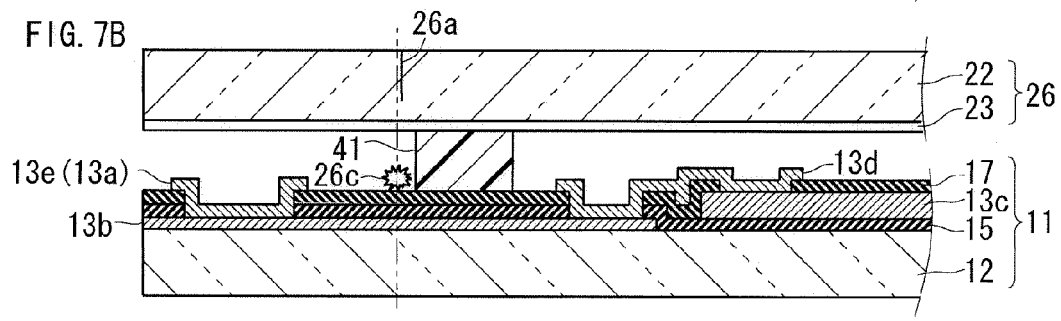

Subsequent to the connection, as shown in FIG. 7B, a process of forming an incision 26a in a thickness direction (vertical direction) on a surface of the counter substrate 26 at opposite side of the first substrate 11 is performed. For example, this incision 26a is formed by a diamond cutter, a wheel device, and the like.

The incision 26a is formed at the position to be the cut line mentioned above (the boundary between the display region 11a and the circuit component mounting region 11b of the first substrate 11), in other words, the incision 26a is formed above the wiring protection pattern 16. One example is shown in FIG. 7B that the incision 26a is positioned outside (the end side of the counter substrate 26) of the seal member 41.

Figure 7C:
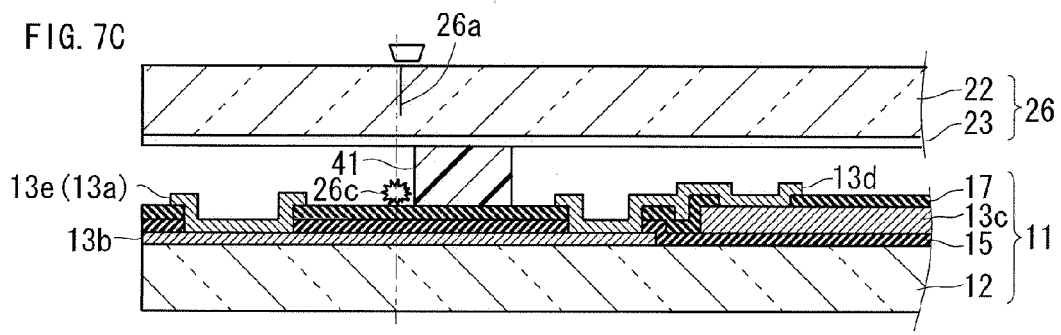

After that, the point where the incision 26a is positioned is pressurized and is broken as shown in FIG. 7C.

Figure 7D:
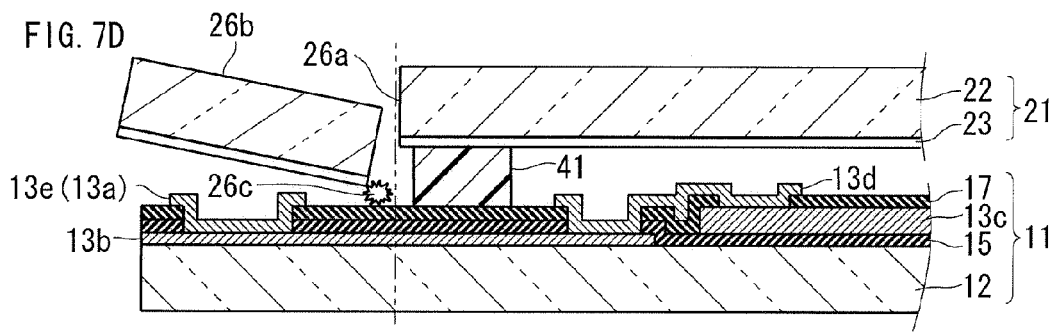

FIG. 7D shows that an unnecessary part of the counter substrate 26 (a part that faces the circuit component mounting region 11b, referred to as an "offcut 26b") is cut (removed) by the application of pressure. This forms the second substrate 21 with a cut end for exposing the circuit component mounting region 11b.

After that, the space surrounded by the first substrate 11, the second substrate 21, and the seal member 41 is filled up with the liquid crystals to form the liquid crystal layer 42. Then, the FPCs 31 are mounted on the circuit component mounting region 11b. In this manner, the display panel 1 is manufactured.

Figure 8:
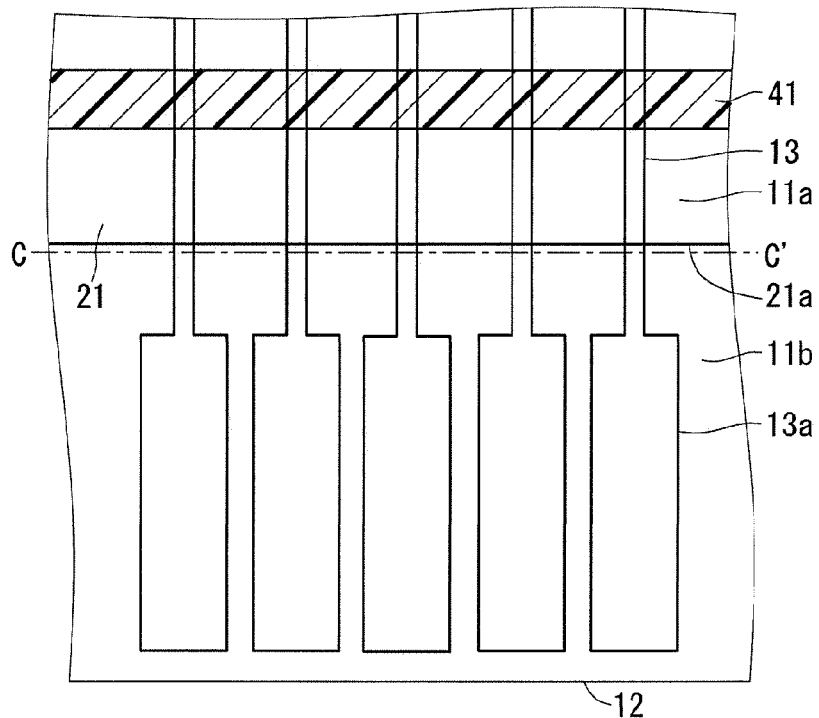
FIG. 8 is an enlarged plan view showing a configuration of a related display panel.
Figure 9:
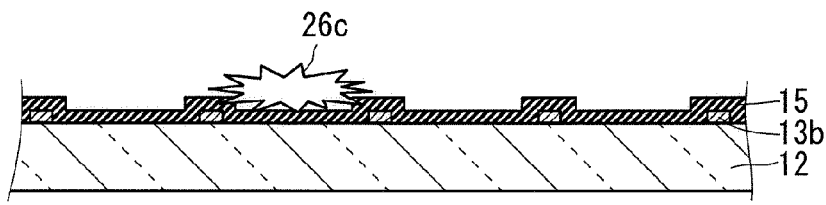
FIG. 9 is a cross sectional view showing the configuration of the related display panel.

To describe the effect of the display panel 1 manufactured in the manner above, a related display panel that relates to the display panel 1 is described next. FIG. 8 is an enlarged plan view of a configuration of the related display panel as shown similarly in FIG. 3. FIG. 9 is a cross sectional view taken along a C-C' line as shown in FIG. 8.

In the process shown in FIG. 7B among the manufacturing processes described above, the incision 26a is formed in the counter substrate 26, so that many sharp foreign matters 26c are generated. The related display panel shown in FIGS. 8 and 9 has no wiring protection pattern 16 shown in FIGS. 3 and 5, and thus there is a high possibility that the first source wiring 13b having a convex shape comes into contact with (adheres to) the foreign matter 26c through the protective insulating film 17. Under the circumstance where the foreign matter 26c is came into contact (adhered), if an external force is applied to the foreign matter 26c for some reasons, there is a high possibility that the protective insulating film 17 and the first source wiring 13b may be damaged. Furthermore, there is a high possibility that the first source wiring 13b having the convex shape comes into contact with the offcut 26b as well as the foreign matter 26c through the protective insulating film 17 and may be damaged in the process shown in FIG. 7D.

When the contact mentioned above causes a serious damage on the first source wiring 13b, a wire breakage and the like occur in the first source wiring 13b, and thus a malfunction such as a line defect of the display occurs. Perhaps, when the first source wiring 13b is not damaged, however the protective insulating film 17 is seriously damaged such that the first source wiring 13b are exposed, the first source wiring 13b is influenced by moisture from the outside which induces electric corrosion as the wiring is repeatedly energized, whereby there is a possibility that the wire breakage occurs in the first source wiring 13b.

Figure 10:
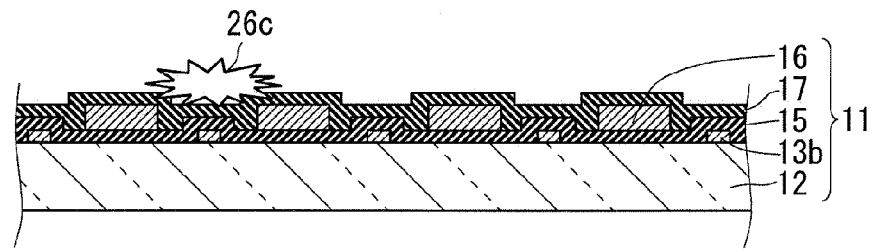
FIG. 10 is a cross sectional view showing an effect of the display panel according to the first preferred embodiment.

In contrast, in the first preferred embodiment, as shown in FIG. 10, the upper end of the wiring protection pattern 16 is positioned above the first source wiring 13b, and the wiring protection pattern 16 prevents the first source wiring 13b from contacting the offcut 26b and the foreign matter 26c. Consequently, a malfunction such as a wire breakage in the cut end 26a (the boundary between the display region 11a and the circuit component mounting region 11b) can be suppressed. Moreover, since the wiring protection pattern 16 is in a floating potential state, it is possible to suppress a decrease in manufacturing yield due to a wire breakage and the like without deteriorating the characteristics of the display panel 1 and reducing the degree of freedom in designing. Therefore, the display panel 1 and the display device including the same can be achieved with high productivity and reliability.

In the first preferred embodiment, the wiring protection pattern 16 is formed of the same metal film as that of the second source wiring 13c, so that they can be formed in the same process to allow the manufacturing process to be simplified.

It is preferable that the wiring protection pattern 16 is formed of a metal film having higher hardness than a metal film of the first source wiring 13b such that, for example, the first source wiring 13b is formed of aluminum film and the wiring protection pattern 16 is formed of copper film.

Figure 11A:
FIGS. 11A and 11B are views showing an effect of the display panel according to the first preferred embodiment.
Figure 11B:
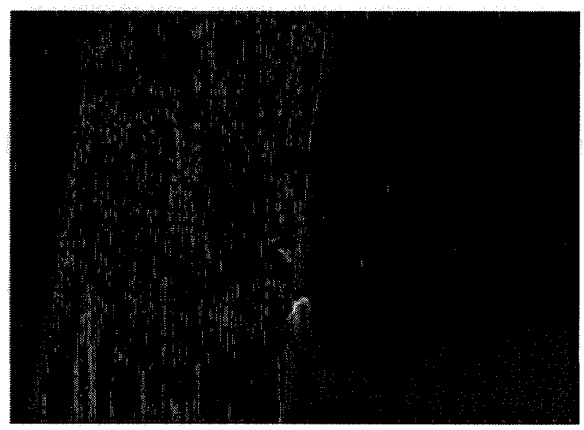

FIGS. 11A and 11B are views showing the result of examining the susceptibility to damage due to the difference in the hardness. In particular, glass wastes are distributed to a sample in which the hardness of the wiring protection pattern 16 is lower than that of the first source wiring 13b (FIG. 11A) and a sample in which the hardness of the wiring protection pattern 16 is greater than that of the first source wiring 13b (FIG. 11B), a load is applied above the glass wastes, and then an occurrence of damage is observed by a SEM.

As shown in FIG. 11A, in the case where the hardness of the wiring protection pattern 16 is lower than that of the first source wiring 13b, the wiring protection pattern 16 is easily deformed and the protective insulating film 17 on the first source wiring 13b is easily damaged. On the other hand, in the case where the hardness of the wiring protection pattern 16 is higher than that of the first source wiring 13b, it turns out that the protective insulating film 17 on the first source wiring 13b resists damage. Therefore, when the wiring protection pattern 16 is formed of the metal film having the higher hardness than the metal film of the first source wiring 13b, the effect of suppressing damage on the protective insulating film 17 and consequently the first source wiring 13b can be enhanced.

In the descriptions above, it is described that the first wiring is the first wiring 13b, however it is not limited to this. For example, the first wiring may be the gate wirings 14 and the wiring protection pattern similar to the one in the descriptions above may be formed in regard to the gate wirings 14.

In addition, according to the present invention, the preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display panel, comprising:
   a first substrate in which a display region that displays video and a circuit component mounting region on which circuit components are mounted are defined; and
   a second substrate that is disposed to face said display region of said first substrate, an end of said second substrate including a cut end positioned to expose said circuit mounting region of said first substrate, wherein said first substrate includes:
      a plurality of first wirings formed from said display region to said circuit component mounting region; and
      a wiring cut protection pattern formed in a region corresponding to said cut end of said second substrate between any adjacent said first wirings, wherein no portion of said wiring cut protection pattern overlaps with said first wirings in plan view, wherein a first portion of said wiring cut protection pattern is located in said display region of said first substrate, and
   in a cross sectional view, an upper end of said wiring cut protection pattern is located above an upper end of said first wirings.

2. The display panel according to claim 1, wherein said first substrate further includes a second wiring formed in said display region, and
said wiring cut protection pattern is formed of a same metal film as that of said second wiring.

3. The display panel according to claim 1, wherein said wiring cut protection pattern is formed of a metal film having higher hardness than that of said first wirings.

4. The display panel according to claim 1, wherein said wiring cut protection pattern is formed of a metal film having greater film thickness than that of said first wirings.

5. The display panel according to claim 1, wherein said wiring cut protection pattern is formed along said cut end,
said first portion of said wiring cut protection pattern is formed between said first substrate and said second substrate,
a second portion of said wiring cut protection pattern is formed in said circuit component mounting region, and
said second portion is provided over a portion of said first substrate that is exposed relative to said second substrate.

6. The display panel according to claim 1, wherein said first wirings are formed from said display region to said circuit component mounting region through said cut end of said second substrate in plan view, and
said wiring cut protection pattern is formed between any adjacent said first wirings from said display region to said circuit component mounting region through said cut end of said second substrate in plan view.

7. A display device provided with a display panel, wherein said display panel includes:
   a first substrate in which a display region that displays video and a circuit component mounting region on which circuit components are mounted are defined; and
   a second substrate that is disposed to face said display region of said first substrate, an end of said second substrate including a cut end positioned to expose said circuit mounting region of said first substrate, wherein
said first substrate includes:
   a plurality of first wirings formed from said display region to said circuit component mounting region; and
a wiring cut protection pattern formed in a region corresponding to said cut end of said second substrate between any adjacent said first wirings, wherein no portion of said wiring cut protection pattern overlaps with said first wirings in plan view, wherein a first portion of said wiring cut protection pattern is located in said display region of said first substrate, and
in a cross sectional view, an upper end of said wiring cut protection pattern is located above an upper end of said first wirings.

8. The display device according to claim 7, wherein said wiring cut protection pattern is formed along said cut end,
said first portion of said wiring cut protection pattern is formed between said first substrate and said second substrate,
a second portion of said wiring cut protection pattern is formed in said circuit component mounting region, and
said second portion is provided over a portion of said first substrate that is exposed relative to said second substrate.

9. The display device according to claim 7, wherein said wiring cut protection pattern is formed of a metal film having higher hardness than that of said first wirings.

10. The display device according to claim 7, wherein
said first wirings are formed from said display region to said circuit component mounting region through said cut end of said second substrate in plan view, and
said wiring cut protection pattern is formed between any adjacent said first wirings from said display region to said circuit component mounting region through said cut end of said second substrate in plan view.

* * * * *